United States Patent [19]

Ehrlich

[11] Patent Number: 4,969,659
[45] Date of Patent: Nov. 13, 1990

[54] EXTENDABLE CONTAINER CHASSIS

[75] Inventor: Rodney P. Ehrlich, Monticello, Ind.

[73] Assignee: Wabash National Corporation, Lafayette, Ind.

[21] Appl. No.: 358,557

[22] Filed: May 30, 1989

[51] Int. Cl.⁵ .............................................. B60P 1/00
[52] U.S. Cl. .................................. 280/407.1; 280/656
[58] Field of Search ................ 280/149.2, 656, 407.1, 280/638, 491.2, 789; 414/477, 522

[56] References Cited

U.S. PATENT DOCUMENTS

| 3,239,274 | 3/1966 | Weiss | 280/656 |
| 4,286,797 | 9/1981 | Mekosh et al. | 280/149.2 |
| 4,635,742 | 1/1987 | Bertouni | 280/149.2 |
| 4,783,093 | 11/1988 | Cusick | 280/656 |
| 4,838,566 | 6/1989 | Baxter | 280/149.2 |

FOREIGN PATENT DOCUMENTS

| 3620328 | 2/1987 | Fed. Rep. of Germany | 280/149.2 |
| 2137940 | 10/1984 | United Kingdom | 280/149.2 |

Primary Examiner—Charles A. Marmor
Assistant Examiner—Victor E. Johnson
Attorney, Agent, or Firm—Richard Bushnell

[57] ABSTRACT

An extendable container chassis capable of transporting a standard relatively short container which is heavily loaded. The extendable container chassis includes first and second chassis members, slide means connecting the first and second chassis members for movement between a retracted position and extendable position and roller bearing means positioned between the first and second chassis member and connected to the first chassis member and means engagable with the roller bearing means for displacing the roller bearing means from the second chassis member.

10 Claims, 5 Drawing Sheets

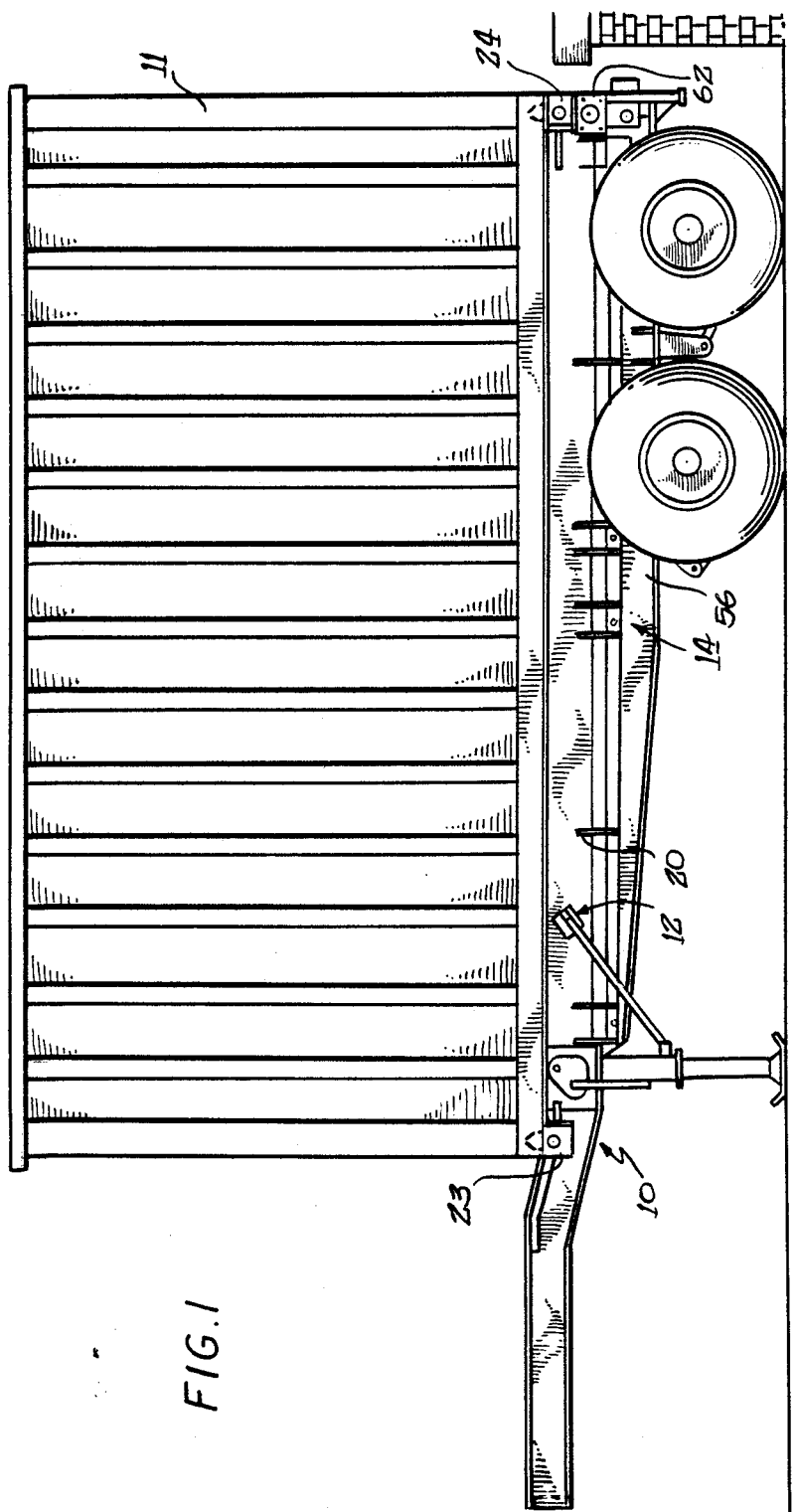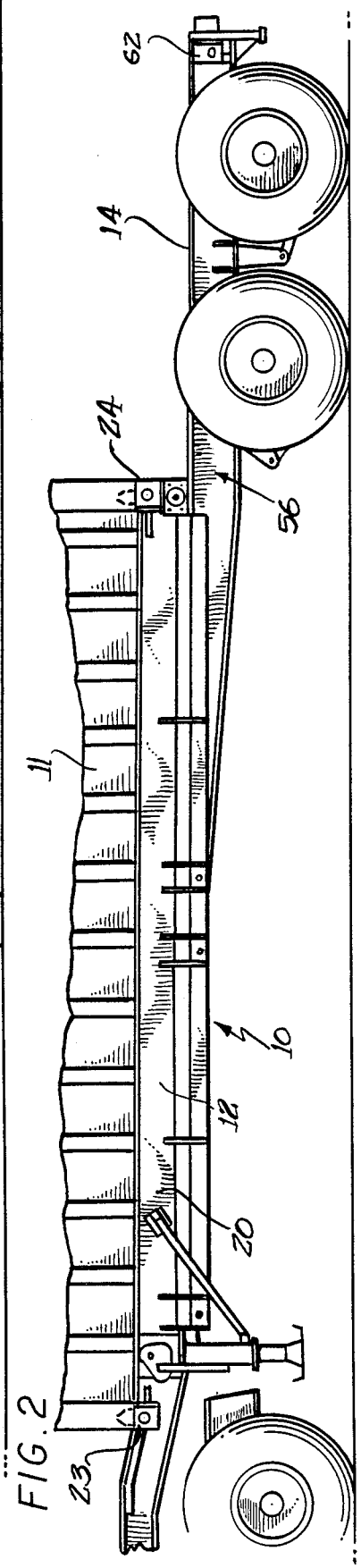

EXTENDABLE CONTAINER CHASSIS

BACKGROUND OF THE INVENTION

The present invention relates generally to a container trailer chassis, and more particularly, the invention relates to a chassis which is capable of transporting a standard relatively short container which is heavily loaded.

There are many trailers described in the art suitable for transporting either standard 40 foot containers or 20 foot containers. However, most such trailers are not adapted to easily and economically transport a 20 foot or other relatively short container which is heavily loaded. The Interstate Bridge Laws dictate the maximum weights or loads trucks or the like can carry over bridges on interstate and other public highways. The amount of weight a truck can carry over a bridge is a function of the wheel base to wheels.

The following Federal Bridge Formula is used to calculate the maximum amount of weight a truck can bear.

Formula B: $W=500(LN/N-1+12N+36)$

W = maximum weight in pounds carried in any group of two or more axles computed to the nearest 500 pounds.

L = distance in feet between the extremes of any group of two or more consecutive axles N = number of axles in the group under consideration.

Thus, in accordance with the above-identified formula, the longer the trailer the less stress on the bridge. As previously indicated, the two most standard or popular containers are the 20 foot container and the 40 foot container. A 20 foot container weighs approximately 4,000 pounds and can carry a load of 50,000 pounds on a standard 20 foot chassis. However, it is sometimes desirable to use a 20 foot container to carry a load which weighs over 50,000 pounds.

In order to accomplish this and be within the Federal Highway Laws, the chassis must extend beyond the 20 foot container.

There are many chassis on the market which extend beyond the standard 20 foot container. For example, there are prior art chassis which extend 3 feet in front of the container and approximately 4 feet beyond the container. The overall length of this chassis is 27.5 feet. However, the length of this chassis does not increase the overall amount of weight which the truck can bear under the aforementioned Federal Highway Laws. Moreover, when a standard 20 foot container is mounted on a 40 foot chassis, it is difficult to load and unload the container from a loading dock.

Heretofore, attempts to use an extendible chassis with a heavily loaded 20 foot container have been unsuccessful. When a heavily loaded container is mounted on an extendible chassis, the steel beams of the upper chassis gall or tear at the steel beams of the extendible or lower chassis member. This is due to the fact that the bearings used heretofore were not able to carry the extra weight.

Accordingly, a general object of the present invention is to provide a new and improved extendible trailer chassis, which is simple in design and easy to manufacture and moves between a retracted position and an extended position.

A more particular object of the present invention is to provide an extendible chassis having a roller bearing that can withstand a relatively high amount of weight related stress.

These and other objects and features of the present invention will become more apparent from the reading of the following descriptions.

SUMMARY OF THE INVENTION

The present invention provides an extendible trailer chassis for use in carrying a container or the like. The extendible trailer chassis includes a first chassis member having a pair of laterally spaced I-beams connected at the common front and rear ends by a front cross beam and a rear cross beam respectively. The extendible trailer chassis also includes a second chassis member and slide means which connect the first and second chassis members for movement between a retracted position and an extended position. The second chassis member includes a pair of laterally spaced I-beams joined by a plurality of cross members. Roller bearing means are positioned between first chassis member and the second chassis member and are connected to the first chassis member by bracket means for rolling engagement with I-beams of the second chassis member. Locking means selectively releasably secure the second chassis member to the first chassis member in the extended and retracted positions. The extendible trailer chassis also includes means engagable with the roller bearing means for displacing the roller bearing means from the I-beams of the second chassis member during transportation of the trailer chassis.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which:

FIG. 1 is a side view showing a trailer structure incorporating the features of the present invention;

FIG. 2 is a fragmentary view of FIG. 1 showing the trailer chassis of FIG. 1 in an extended position;

DETAILED DESCRIPTION OF THE ILLUSTRATED EMBODIMENT

Figure 3:
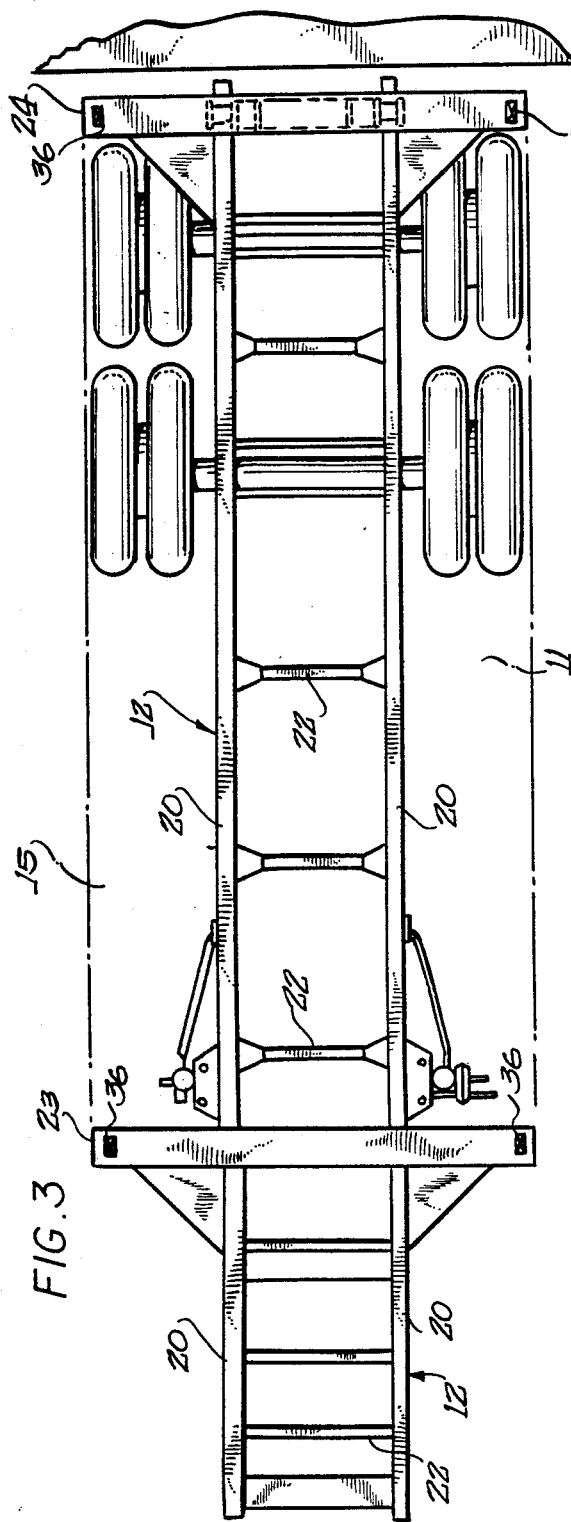
FIG. 3 is a top plan view of the trailer chassis.

Turning to the drawings wherein like components are designated by like reference numerals throughout the various figures a trailer chassis structure, constructed in accordance with the present invention, is illustrated in FIG. 1 and generally designated by reference numeral 10.

The chassis 10 includes a first or upper chassis member or section 12 supported by a wheel truck assembly 13 and a second or lower or extendible chassis member or section 14 as shown in FIGS. 1 and 2. The lower chassis member is movable relative to chassis section 12 between a fully retracted position shown in FIG. 1 and a fully extended position shown in FIG. 2. A relatively short or standard 20 foot container 11 is to be mounted on the chassis as will be discussed in detail below. The upper chassis member 12 and the extendible member 14 are operatively connected by slide means 13 which will be described below.

Figure 4:
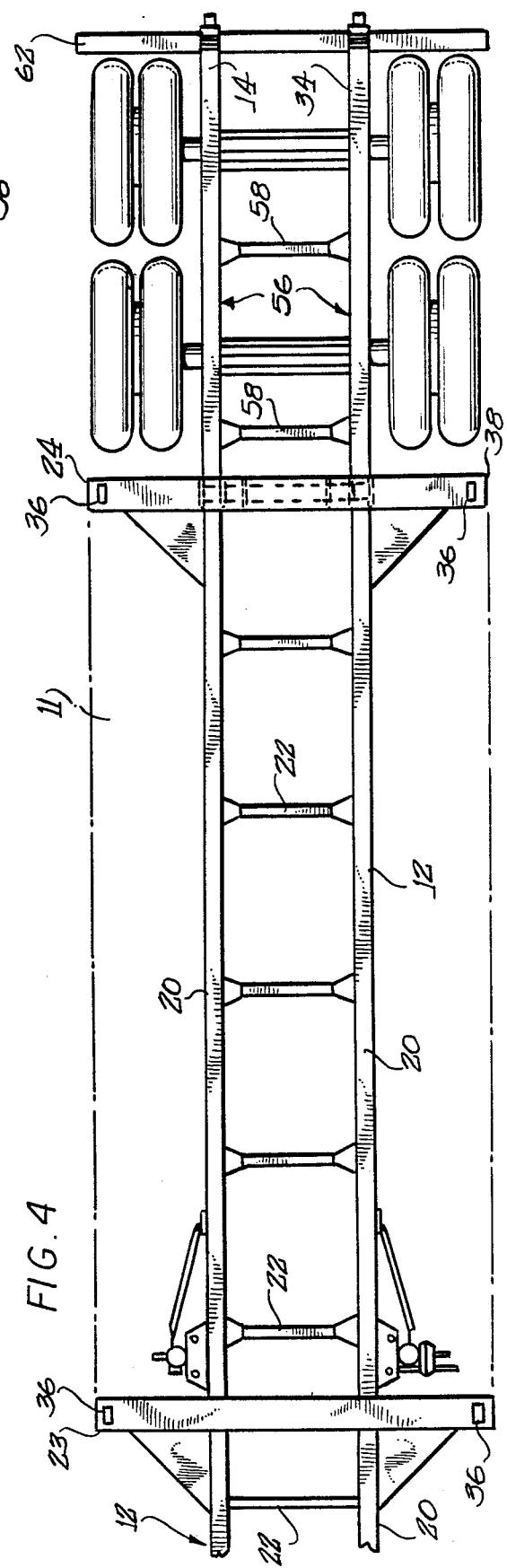
FIG. 4 is a view similar to FIG. 3 showing the trailer chassis in an extended position.
Figure 5:
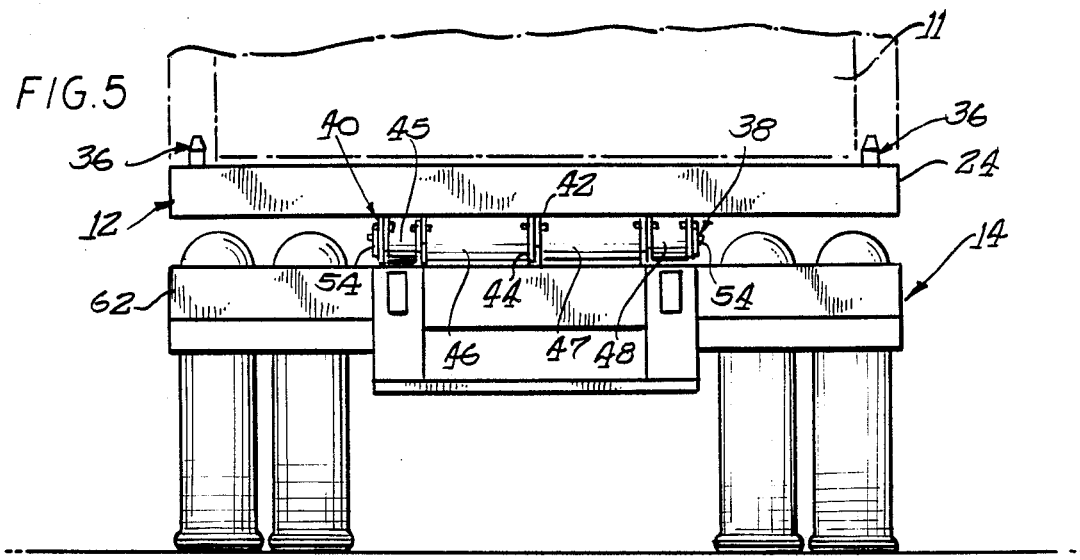
FIG. 5 is a fragmentary end view of the trailer chassis.

The upper chassis member 12 includes a pair of substantially parallel upper I-beams 20 integrally joined by a plurality of spaced apart cross beams 22 as shown in FIGS. 3 and 4. In addition, the I-beams 20 are joined at their common opposite ends by a front end rail 23 and a rear end rail 24. As shown best in FIG. 7, I-beams 20 include a top plate or horizontal member or flange 15, a bottom plate or horizontal member or flange 25 joined at approximately their mid-sections by a vertical member or web 27. The end rails 23 and 24 include a substantially U-shaped portion 26 as shown best in FIG. 8. The U-shaped portion 26 includes a bottom wall 28 and a pair of side walls 30 and 32. A top plate 34 is welded to the top portions of side walls 30 and 32.

Figure 8:
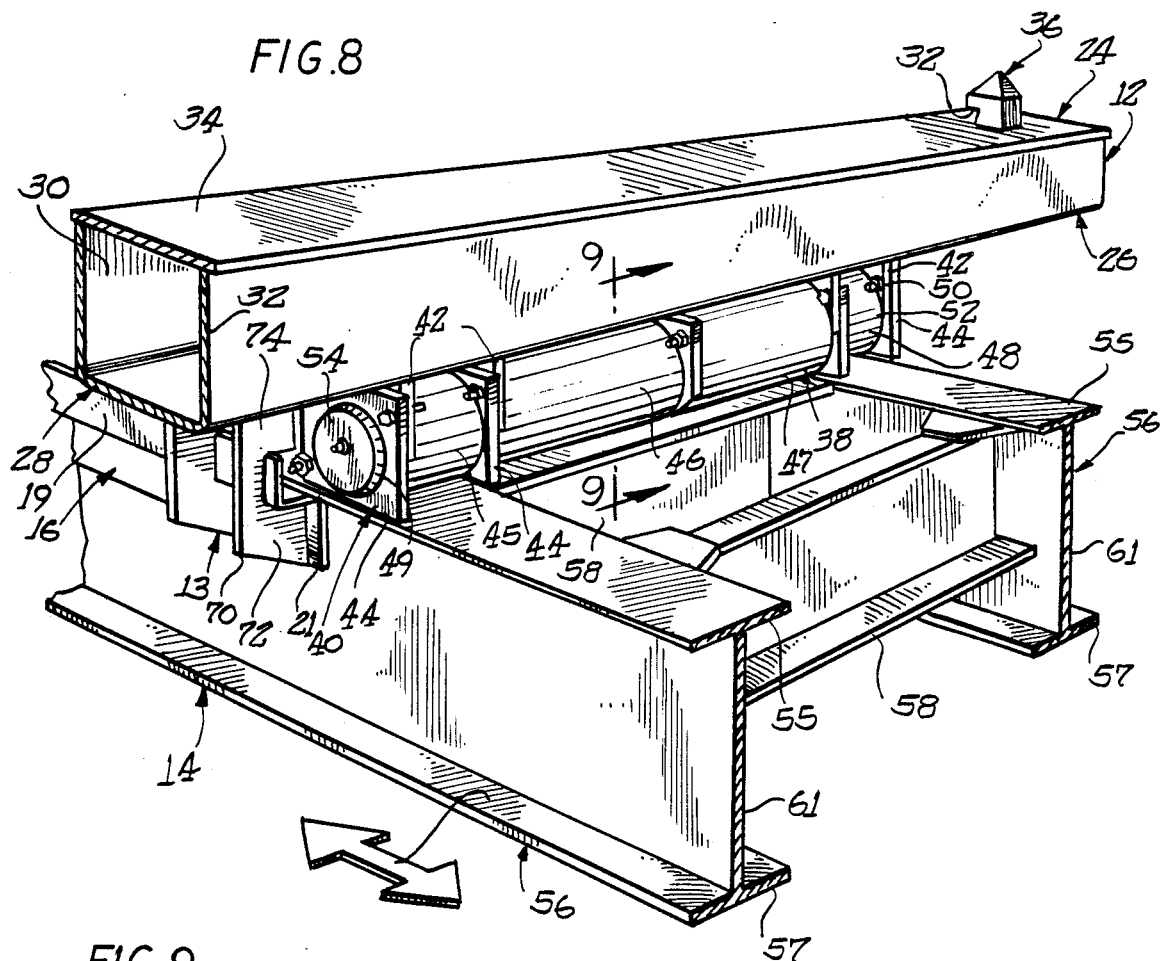
FIG. 8 is an enlarged fragmentary perspective view of the trailer chassis.

As shown best in FIGS. 3 and 8 twist lock means 36 extend substantially vertically from the top plate 34 at a position adjacent each end of the front and rear end plates 23 and 24.

The twist lock means 36 includes a notch 37. The twist lock means 36 are positioned to mate with corresponding locking apertures (not shown) located at each corner of the bottom of the container 15. Thus, when the container 15 is mounted on the upper chassis 12 the twist lock means 36 engage the locking apertures. The twist lock means 36 are manually turned or locked by a suitable tool (not shown) to secure the container to the chassis 10.

A roller bearing 38 is connected to the bottom wall 28 of the rear end rail 24 by bracket means 40. As shown best in FIGS. 8 and 9, the bracket means 40 include an upper bracket 42 and a lower bracket 44.

The roller bearing 38 includes a continuous axle 43 extending between the brackets 42 and 44 located toward opposite ends of rail 24 and four hollow cylindrical rollers or bearings 45, 46, 47 and 48 which cover the axle 43 and are rotatable thereon. A grease fitting 49 is provided in an end of the axle 43 for introducing lubricants into passageways, not shown, in the axle for lubricating the mating bearing surfaces between the axle and the rollers.

Figure 9:
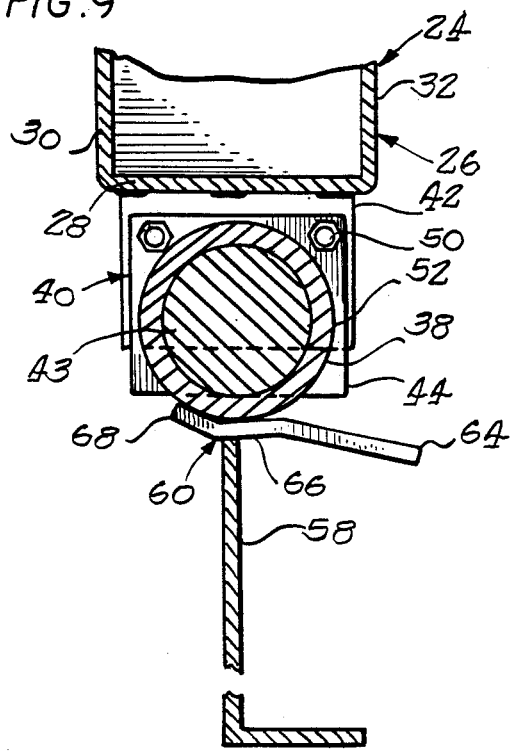
FIG. 9 is an enlarged fragmentary view taken along line 9—9 of FIG. 8.

The upper and lower brackets 42 and 44 overlap each other as shown best in FIGS. 8 and 9. The upper and lower brackets 42 and 44 are secured by suitable bolt means 50. The brackets 42 and 44 combine together to define an inner diameter aperture 52 for receiving the axle 43.

The ends of outer rollers 45 and 48 extend beyond the outermost bracket means 40 and are welded or otherwise secured with respect thereto as at 54.

As shown best in FIGS. 4 and 7-10 the extendible member 14 includes a pair of substantially parallel lower or rear I-beams 56 integrally joined by a plurality of spaced cross members 58. I-beams 56 include a plurality of spaced apertures 59. The purpose of the apertures 59 will be discussed in detail below. I-beams 56 include top plate or horizontal member or flange 55 and bottom plate or horizontal member or flange 57 attached at approximate mid-section by a vertical member or web 61. The common ends of the rear of I-beams 56 are joined by a rear cross member 62.

Figure 6:
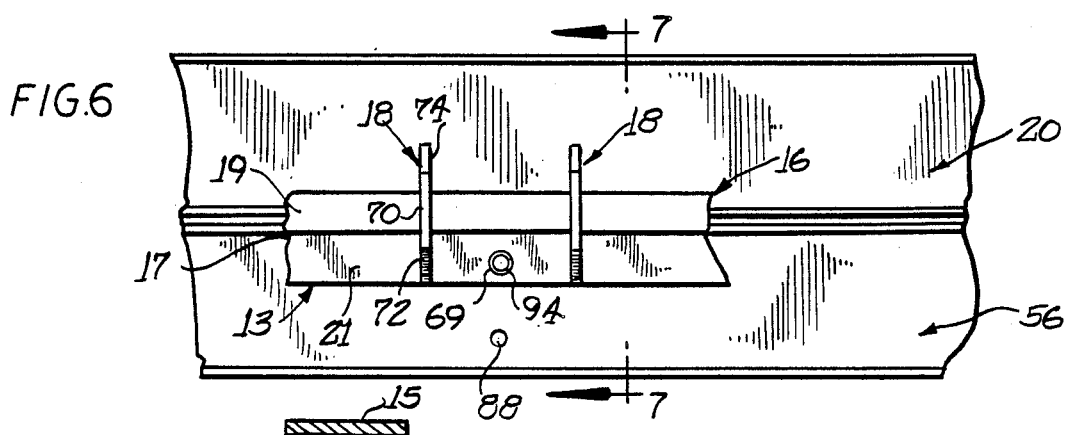
FIG. 6 is an enlarged fragmentary side view of a portion of overlapping front and rear sections of the chassis.
Figure 7:
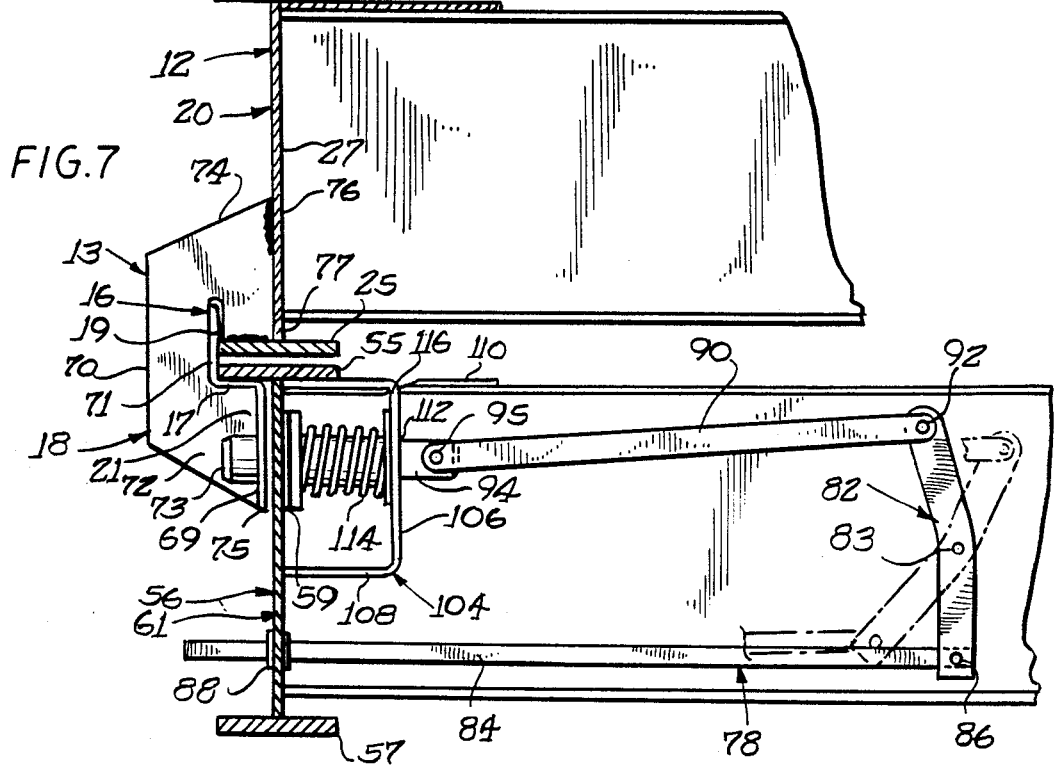
FIG. 7 is an enlarged fragmentary view taken along line 7—7 of FIG. 6.

As previously set forth, the chassis 10 also includes slide means 13 at opposite sides of the chassis, only the slide means at the side presented in FIGS. 6-8 being shown. Each of the slide means 13 includes an overlaying slide or guide member 16 which overlaps the adjacent I-beam 20. A plurality of gussets 18 are spaced along and welded to each side of the upper chassis 12 and are also welded or otherwise secured to the adjacent guide or slide member 16.

The guide or slide member 16 includes a substantially horizontal ledge or flange portion 17 underlying the top plate or flange 55 of I-beam 56, a substantially vertical leg portion 19 which extends upwardly from one end of the flange 17 and slidably engages an outer edge of flange 55. Guide member 16 also includes a substantially vertical leg portion 21 which extends downwardly from the other end of ledge 17 and overlaps a portion of the web 61 of I-beam 56. As shown best in FIGS. 7 and 8, a portion of leg 19 is welded to a portion of the bottom plate 25 of I-beam 20 of the upper chassis member 12 and a portion of top plate 55 of I-beam 56 of extendible member 14 rests on the ledge 17 of the slide member 16. The leg member 21 includes a plurality of spaced preformed apertures 69 which will be discussed in detail below.

The gusset 18 is substantially U-shaped and overlaps the slide member 16. The gusset 18 includes a base member 70 and a pair of laterally spaced end portions 72 and 74 which flare outwardly. As shown best in FIG. 7, the leg 19 of the guide member 16 lays flush against an inside edge 71 of the base 70 and the ledge 17 lays flush against an inside edge 73 of end 72 of the gusset 18. In addition, leg 21 of the guide member 16 is welded to a bottom portion 75 of end 72 of gusset 18. An edge 76 of end 74 of the gusset 18 is welded to a portion of web 27 of I-beam 20. An inside portion 77 of the end 74 of gusset 18 is welded to a portion of the bottom plate 25 of I-beam 20.

Locking means 78 is provided for releasably securing the gusset 18 and the slide member 16 to the extendible member 14 of the chassis at predetermined positions thereby securing the extendible member 14 to the upper chassis 12 at a desired position.

The locking means 78 as shown in FIG. 7, includes a crank or pivot arm member 82 mounted on a pivot pin 83. One end of the pivot arm member 82 is pivotally attached to a rod or shaft 84 by pivot pin 86. Rod 84 extends through a preformed aperture 88 in one of the lower I-beams 56 of the extendible member 14. The other end of arm 82 is pivotally attached to a rod or shaft 90 by pivot pin 92. Rod 90 is attached to a locking pin 94 by bolt means 95. Locking pin 94 extends through one of the preformed apertures 59 in one of the I-beams 56, and a preformed aperture 69 in leg member 21 of the slide member 16. The preformed aperture 88 is positioned below preformed aperture 59 in I-beam 56. Aperture 69 in leg member 19 is also aligned with aperture 59 of I-beam 56. A guide member 104 encloses a portion of locking pin 94. Guide member 104 includes a guide end wall 106 and two laterally spaced side walls 108 and 110 respectively. Side wall 108 is welded to a portion of the inside of web 61 of I-beam 56 and side wall 110 is welded to a portion of top plate 55 of I-beam 56. Guide wall 106 includes aperture 112 and locking pin 94 extends therethrough. Aperture 112 aligns with aperture 59 of I-beams 56 and aperture 69 of leg 21 of slide member 16.

A coil spring 114 encircles the locking pin 94 and is positioned inside the guide member 104. A washer 116 is secured to a portion of locking pin 94 located inside guide member 104 and the spring 114 bears against the washer 116 for bracing the pin 94 to its extended locking position shown in FIG. 7.

In order to release the extendible chassis member 14, rod 84 is pulled outwardly or to the left as shown in FIG. 7 forcing the pivot arm 82 to pivot and pull rod 90 away from I-beam 56 thereby pulling locking, pin 94 through apertures 69 and 59, and causing the coil spring 114 to compress. The extendible member 14 can then be moved between the retracted position shown in FIG. 1 and the extended position shown in FIG. 2.

When the extendible member 14 is extended to the desired length the rod 84 is pushed towards pivot arm 82 causing the lower part of pivot arm 82 to pivot or extend away from guide member 104 and the upper part of pivot arm 82 to move towards the guide member 104 simultaneously releasing the coil spring 114 forcing locking pin 94 to snap through apertures 59 in I-beam 56 and aperture 69 in slide member 16 thereby locking the extendible member 14 in the desired retracted or extended position.

As previously indicated, when the container 11 is carrying a load over 50,000 pounds it is necessary to operate the vehicle in the U extended position.

When the extendible member 14 is in the extended position as shown in FIG. 2, the roller bearing 38 overlies a foremost cross member 58 of the extendible member 14. As shown best in FIGS. 8, 9 and 10, the outermost rollers 45 and 48 extend over I-beams 56 and the two center or middle rollers 46 and 47 are positioned to seat on a cross member or plate 60 which is welded on top of the adjacent member 58.

Plate 60 has a first inclined ramp portion 64, a second horizontal portion, 66 and a raised portion 68. The raised portion 68 of cross member 60 elevates roller bearing 38 so that rollers 45 and 48 are positioned slightly above the top plates 55 of I-beams 56 when the chassis 10 is in the extended position.

Thus, the rollers 46 and 47 and plate 60 combine to provide means for raising or disengaging the bearings 45 and 48 from the bearing surface of the I-beam to prevent galling or tearing into I-beams 56 of the extendible member 14 when the vehicle is transporting a heavily loaded container 11.

The ramp 64 of the cross member 60 enables roller bearing 38 to easily roll onto or roll off of cross member 60 when the extendible member 14 is being moved between the retracted position shown in FIG. 1 and the extended position of FIG. 2.

Figure 10:
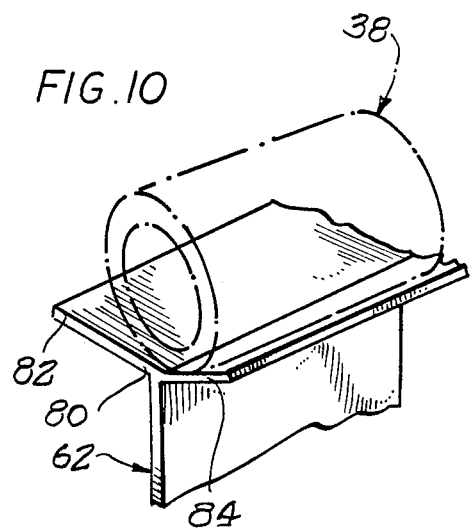
FIG. 10 is an enlarged fragmentary view of FIG. 9.

As shown in FIG. 10, the rear cross member 62 has a top plate 80 including an inclined ramp portion 82 and a raised support and stop portion 84.

When the extendible member 14 is being retracted roller bearing 38 easily rolls onto the ramp 82 of rear cross member 62. Raised portion 84 of rear cross member 62 elevates the roller bearing 38 so outermost rollers 45 and 48 extend slightly above I-beams 56. Thus, when the chassis is traveling in the retracted position the bearings 45 and 48 will not gall or tear the lower I-beams 56.

It will be appreciated that when the chassis is in the extended position of FIG. 2, loading and unloading of the container would be difficult since the container could not be positioned immediately adjacent a loading dock. However, as shown in FIG. 1, when chassis 10 is in the retracted position the container 11 is positioned so that it can easily be unloaded and/or loaded from the loading dock.

Figure 11:
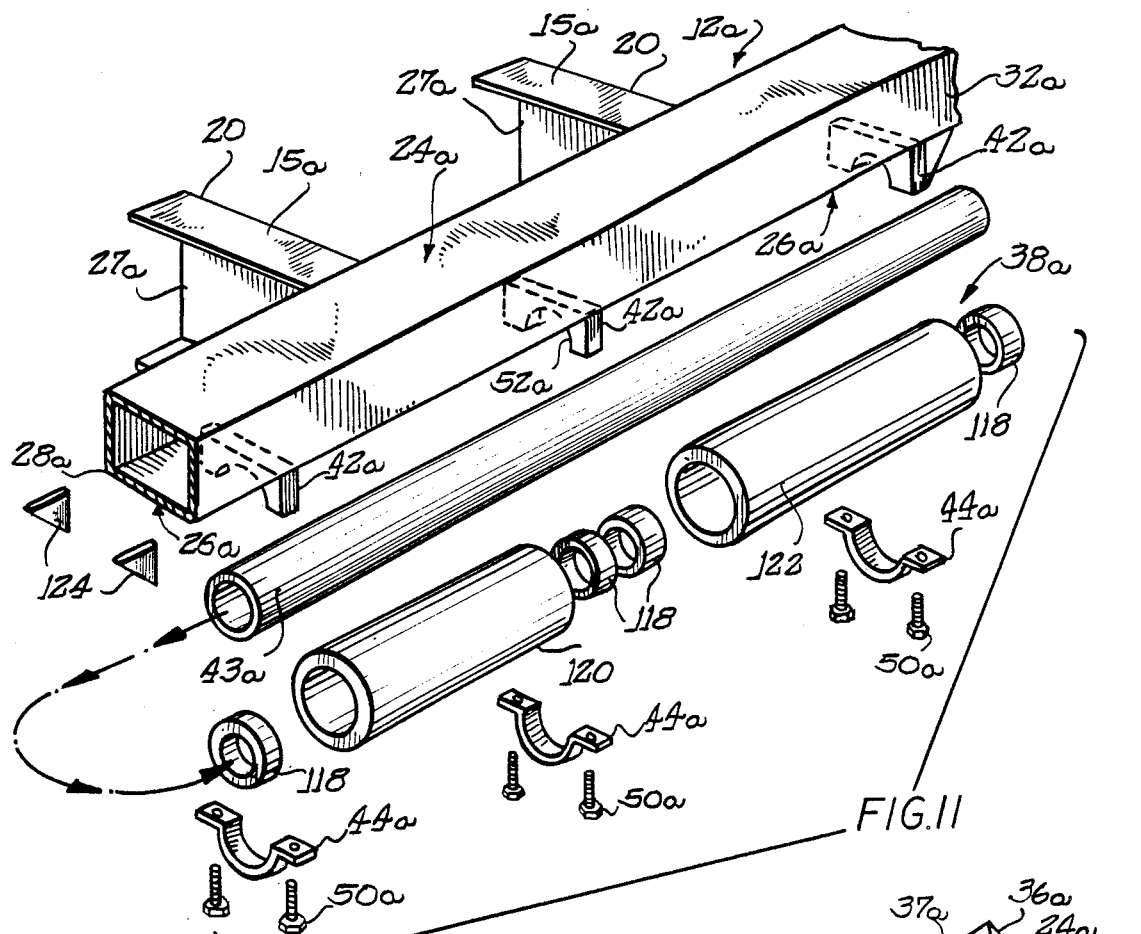
FIG. 11 is an enlarged exploded fragmentary view of another embodiment of this invention.
Figure 12:
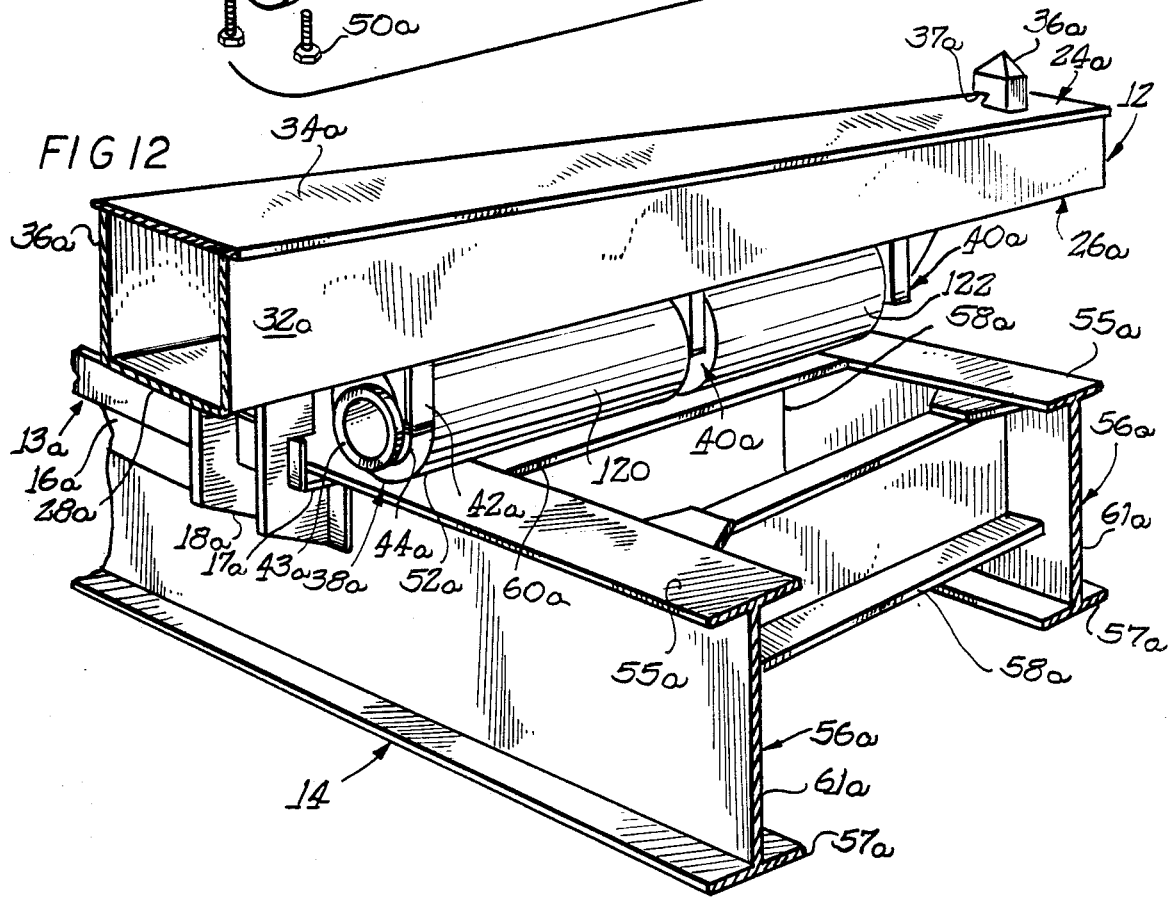
FIG. 12 is an enlarged fragmentary view similar to FIG. 8 showing the embodiment of the invention shown in FIG. 11.

FIGS. 11 and 12 show a second embodiment of this invention in which elements corresponding to the above-identified elements are designated with the same reference numerals with suffix a.

As shown in FIGS. 11 and 12 a roller bearing 38a is connected to the bottom wall 28a of the rear end rail 24a by bracket means 40a. Bracket means 40a include an upper bracket 42a and a lower bracket 44a.

The roller bearing 38a includes a continuous axle 43a extending between the bracket means 40a as shown in FIG. 12. A plurality of circular self lubricated oil bearings or sintered bearings 118 fit over the axle 43a and are rotatable thereon. The inner diameter of the sintered bearings 118 is slightly greater than the outer diameter of the axle 43a.

The upper bracket 42a is substantially U-shaped and is welded or otherwise secured to the bottom wall 28a of the rear end rail 24a. The lower bracket 44a is also substantially U-shaped and is connected to the bottom of the upper bracket 44a by suitable bolt means 50a. The brackets 42a and 44a combine together and define an inner diameter aperture 52a for receiving axle 43a.

A pair of cylindrical rollers or bearings 120 and 122 cover the axle 43a and the sintered bearings 118 thereon. The outer diameter of the sintered bearings 118 is slightly less than the inner diameter of the bearings 120 and 122. The bearings 120 and 122 are respectively trapped and retained along with the bearings 118 between the outer and inner axle supporting brackets 40a.

As previously indicated the sintered bearings 118 are lubricated with oil or the like for lubricating the mating bearing surfaces between the axle 43a and rollers 120 and 122.

A pair of supports 124, shown best in FIG. 11, are welded to the upper bracket 42a as shown in FIG. 12 to help secure the bracket means 40a and the roller bearing 38a to the upper chassis member 12a.

When the extendible member 14a is in an extended position, as shown in FIG. 12, the roller bearing 38a overlies a foremost cross member 58a. An outer portion of each roller 120 and 122 extends over the top-plates 55a of I-beams 56a.

The inner portion of rollers 120 and 122 seat on cross plate 60a which is welded on top of adjacent member 58a. The top plate 60a is identical to the above described member 60 and has a raised portion, not shown, identical to the raised portion 68 for elevating the roller bearing 38a so that rollers or bearings 120 and 122 are positioned slightly above top plates 55a of I-beams 56a when the chassis 10 is in the extended position.

Accordingly, rollers 120 and 122 and top plate 60a combine to provide means for raising or disengaging the bearings 120 and 122 from the bearing surface or top plate 55a of I-beams 56a when the member 14a is in the retracted position to prevent galling or tearing into the I-beams 56a of the extendible member 14a when the vehicle is transporting a heavily loaded container 11.

In addition, when the extendible member 14a is in the retracted position, the rollers 120 and 122 seat on rear cross member 62. The raised portion 84 of top plate 80 of cross member 62 elevates roller 120 and 122 slightly above top plates 55a of I-beams 56a. Thus, when the chassis is traveling in the retracted position rollers 120 and 122 will not gall or tear into the bearing surface of the lower I-beams 56a.

The invention is claimed as follows:

1. An extendible trailer chassis for use in carrying a container, said chassis comprising a first chassis member having a pair of laterally spaced I-beams connected at their common front and rear ends by a front cross beam and a rear cross beam respectively, a second chassis member, slide means connecting said first and second chassis members for movement between a retracted position and an extended position, said second chassis member having a pair of laterally spaced I-beams joined by a plurality of cross members, roller bearing means positioned between said first chassis member and said second chassis member and being connected to said first chassis member by bracket means for rolling engagement with said I-beams of said second chassis member, and locking means for selectively releasably securing said second chassis member to said first chassis member in said extended and retracted positions, and means engagable with said roller bearing means for displacing said roller bearing means from said last mentioned I-beams during transportation of said trailer chassis said bracket means including a substantially U-shaped upper bracket and a substantially U-shaped lower bracket secured to said upper bracket, said upper bracket being secured to said rear cross beam of said first chassis member.

2. An extendible trailer chassis of claim 1 wherein said roller bearing means extends through said upper bracket and said lower bracket, said roller bearing means having a continuous axle covered by at least one roller.

3. An extendible trailer chassis of claim 1 wherein said slide means includes a slide member extending along the I-beams of said first and second chassis members, said slide member including a ledge portion overlapping a flange portion of one I-beam of said second chassis member, a first leg section extending from one edge of said ledge portion in one direction and a second leg section extending from an opposite edge of said ledge portion in an opposite direction, said first leg member being secured to a part of a gusset and said gusset having first and second ends joined at their common ends by a base section, said first end being secured to a portion of said I-beam of said first chassis member and said base section being secured to said first leg section of said guide member and said second end being secured to said second leg section of said guide member.

4. An extendible trailer chassis of claim 1, wherein said locking means includes a pivot arm, a first actuating rod attached to one end of said pivot arm member, a second rod attached to an opposite end of said pivot arm, a locking pin connected to said second arm and extending through a preformed aperture in an I-beam of said second chassis member and a preformed aperture in said second leg section of said slide member.

5. An extendible trailer chassis, said chassis comprising an upper chassis member having a pair of laterally spaced upper I-beams connected at their common front and rear ends by front and rear cross beams respectively, a lower chassis member underlying and slidably connected to said upper chassis member for selective movement between a retracted position and an extended position, said lower chassis member having a pair of laterally spaced lower I-beams connected by a plurality of cross members, and a roller bearing secured to said rear cross beam of said upper chassis member and being positioned between said upper chassis member and said lower chassis member for riding on upwardly facing bearing surfaces on said lower I-beams, and locking means releasably securing said lower chassis member to said upper chassis member, said extendible chassis member being slidable between a retracted position and an extended position, and means on said lower chassis engagable with said roller bearing when the lower chassis member is in said retracted position for elevating said roller bearing above said lower I-beams.

6. An extendible trailer chassis comprising first and second chassis members, means slidably connecting said first and second chassis members together for relative movement between a first retracted position and a second extended position, bearing means on one of said chassis members, longitudinally extending surface means on the other of said chassis members slidably engagable with said bearing means during relative movement of said chassis members between said retracted and extended positions, and means for disengaging said bearing means from said surface means when said chassis members are either in said retracted position or said extended position for minimizing possible damage to said bearing means and said surface means resulting from road shocks during transport of said trailer chassis said bearing means including roller means and said disengaging means including a portion of said roller means on said one chassis member and means on said other chassis member engagable with said roller portion for relatively spreading said chassis members sufficiently to disengage said roller bearing means from said surface means.

7. An extendible trailer chassis of claim 6, which includes an axle mounted on said one chassis member, said roller means including said roller portion being mounted on said axle.

8. An extendible trailer chassis of claim 6, which includes opposite end and intermediate brackets secured to said one chassis member and supporting opposite ends and an intermediate portion of said axle, said roller means comprising first and second rollers supported on said axle respectively between said opposite end brackets and said intermediate bracket.

9. An extendible truck chassis of claim 6, which includes lubricated annular bearings between said rollers and said axle.

10. An extendible trailer chassis of claim 6, which includes means for selectively releasably locking said chassis members in said extended and retracted positions.

* * * * *